US010801461B2

(12) United States Patent
Imanaka et al.

(10) Patent No.: US 10,801,461 B2
(45) Date of Patent: Oct. 13, 2020

(54) IGNITION APPARATUS

(71) Applicant: DENSO CORPORATION, Kariya, Aichi-pref. (JP)

(72) Inventors: Yasuomi Imanaka, Kariya (JP); Kaori Doi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/302,034

(22) PCT Filed: Apr. 2, 2015

(86) PCT No.: PCT/JP2015/060480
§ 371 (c)(1),
(2) Date: Oct. 5, 2016

(87) PCT Pub. No.: WO2015/156204
PCT Pub. Date: Oct. 15, 2015

(65) Prior Publication Data
US 2017/0122281 A1    May 4, 2017

(30) Foreign Application Priority Data

Apr. 10, 2014    (JP) ................................ 2014-080657

(51) Int. Cl.
*F02P 3/05*    (2006.01)
*F02P 3/08*    (2006.01)
(Continued)

(52) U.S. Cl.
CPC .............. *F02P 3/05* (2013.01); *F02P 3/0892* (2013.01); *F02P 5/1502* (2013.01); *F02P 15/10* (2013.01);
(Continued)

(58) Field of Classification Search
CPC .... F02P 3/05; F02P 3/02; F02P 3/0435; F02P 3/051; F02P 3/053; F02P 17/12;
(Continued)

(56) References Cited

U.S. PATENT DOCUMENTS 5,379,178 A * 1/1995 Graf ........................ F02D 41/20
123/490
5,904,129 A * 5/1999 Kadota ................... F02D 35/02
123/406.45
(Continued)

FOREIGN PATENT DOCUMENTS

JP          0579435 A  *  3/1993
JP          07229461 A  *  8/1995
(Continued)

OTHER PUBLICATIONS

Hayashi, et al., U.S. Appl. No. 15/302,540, filed Oct. 7, 2016 (69 pages).

*Primary Examiner* — Mahmoud Gimie
*Assistant Examiner* — Joshua Campbell
(74) *Attorney, Agent, or Firm* — Nixon & Vanderhye PC

(57) ABSTRACT

An ignition apparatus performs energy input control in which energy is continuously inputted to an ignition coil to enable a spark discharge in a predetermined energy input period after interrupting a primary current by an ignition switch and generating a discharge of a spark plug by a secondary current. A combustion state determination circuit determines a combustion state by comparing a combustion pressure P detected by a combustion state detector. When the combustion pressure P is smaller than a second threshold Pth2, and there is room for improving the combustion state with respect to the present energy input condition, the energy input period IGW is increased or a target secondary current I2* is increased. By compensating the condition of the
(Continued)

energy input control in accordance with the combustion state, a target combustion state can be achieved with just enough energy consumption.

8 Claims, 8 Drawing Sheets

(51) Int. Cl.
| | |
|---|---|
| *F02P 5/15* | (2006.01) |
| *F02P 15/10* | (2006.01) |
| *F02P 17/12* | (2006.01) |
| *F02P 3/02* | (2006.01) |
| *F02D 35/02* | (2006.01) |
| *F02P 3/04* | (2006.01) |
| *F02P 9/00* | (2006.01) |

(52) U.S. Cl.
CPC ............ *F02P 17/12* (2013.01); *F02D 35/023* (2013.01); *F02D 35/024* (2013.01); *F02P 3/02* (2013.01); *F02P 3/0407* (2013.01); *F02P 3/0435* (2013.01); *F02P 3/0442* (2013.01); *F02P 3/051* (2013.01); *F02P 3/053* (2013.01); *F02P 9/007* (2013.01); *Y02T 10/46* (2013.01)

(58) Field of Classification Search
CPC ...... F02P 3/0442; F02P 3/0407; F02P 3/0892; F02D 35/023; F02D 35/024; Y02T 10/46
USPC ........................................................ 123/634
See application file for complete search history.

(56) References Cited

U.S. PATENT DOCUMENTS

| | | | | |
|---|---|---|---|---|
| 6,505,605 B2* | 1/2003 | Yamada | ................ | F02D 37/02 |
| | | | | 123/406.12 |
| 2003/0116148 A1* | 6/2003 | Sakakura | ................ | F02P 3/051 |
| | | | | 123/630 |
| 2008/0127937 A1* | 6/2008 | Toriyama | ................ | F02P 3/053 |
| | | | | 123/406.12 |
| 2011/0270506 A1* | 11/2011 | Maier | .................... | F02P 3/051 |
| | | | | 701/102 |
| 2012/0186569 A1 | 7/2012 | Shimakawa et al. | | |
| 2015/0008838 A1* | 1/2015 | Reuther | ................ | F02P 3/0442 |
| | | | | 315/209 T |

FOREIGN PATENT DOCUMENTS

| | | | | |
|---|---|---|---|---|
| JP | 07229461 A | * | 8/1995 | |
| JP | H07-229461 | | 8/1995 | |
| JP | 2001032758 A | * | 2/2001 | ............. F02P 9/002 |
| JP | 2004-263612 | | 9/2004 | |
| JP | 2004263612 A | * | 9/2004 | |
| JP | 2004263612 A | * | 9/2004 | |
| JP | 2008-088948 | | 4/2008 | |
| JP | 2008088948 A | * | 4/2008 | |
| JP | 2008088948 A | * | 4/2008 | |
| JP | 4938404 | | 5/2012 | |
| WO | WO-2013098112 A1 | * | 7/2013 | |

* cited by examiner

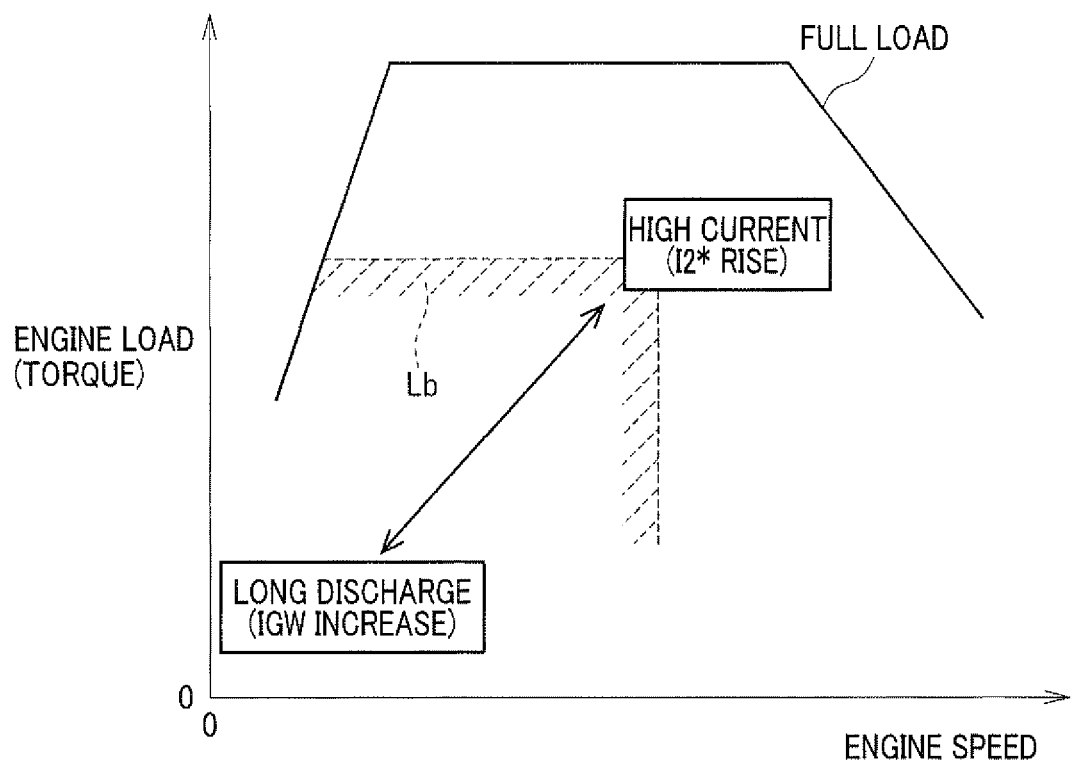

IGNITION APPARATUS

This application is the U.S. national phase of International Application No. PCT/JP2015/060480 filed Apr. 2, 2015 which designated the U.S. and claims priority to JP Patent Application No. 2014-080657 filed Apr. 10, 2014, the entire contents of each of which are hereby incorporated by reference.

TECHNICAL FIELD

The present invention relates to an ignition apparatus for controlling operation of a spark plug.

BACKGROUND ART

Conventionally, there is known an apparatus for avoiding occurrence of misfire in an internal combustion engine. For example, the control apparatus of an internal combustion engine disclosed in patent document 1 avoids occurrence of misfire by measuring a spark discharge time by a spark plug, and switching to a stoichiometric operation when this spark discharge time is shorter than a threshold of the spark discharge time necessary for a lean operation.

CITATION LIST

Patent Literature

[PTL1] Japanese Patent No. 4938404

SUMMARY OF INVENTION

Technical Problem

In the conventional art of patent document 1, since a stoichiometric operation, that is, enrichment of an air-fuel ratio is performed as means for avoiding misfire, consumption of fuel is increased. Particularly, if a stoichiometric operation is performed even when the discharge time is shortened temporarily due to disturbance or the like, there occurs a problem that fuel consumption is unnecessarily worsened.

The present invention has been made in view of the above point, and the purpose thereof is to provide an ignition apparatus capable of achieving a target combustion state at just enough energy consumption.

Solution to Problem

An ignition apparatus of the present invention, that controls operation of a spark plug for igniting an air-fuel mixture in a combustion chamber of an internal combustion engine, includes an ignition coil, an ignition switch, an energy input section, an input energy control section and a combustion state determination section. The ignition coil includes a primary coil through which a primary current supplied from a DC power supply flows, and a secondary coil connected to the electrode of the spark plug. A secondary current occurs due to conduction and interruption of the primary current, more specifically, due to a secondary voltage generated by interruption after conduction of the primary current flows through the secondary coil. The ignition switch is connected to the ground side opposite to the DC power supply of the primary coil, and changes between conduction and interruption of the primary current in accordance with an ignition signal.

The energy input section can input energy within a predetermined energy input period (IGW) after a discharge of the spark plug is generated by the secondary voltage caused by interrupting the primary current by the ignition switch. Preferably, the energy input section is capable of inputting energy from the ground side of the primary coil with the same polarity as the secondary current. The input energy control section controls the input energy input by the energy input section. The combustion state determination section acquires information from a combustion state detector which detects a combustion state in the combustion chamber, and determines the combustion state based on this information. It is characterized that the input energy control section compensates a control value of the input energy in accordance with the combustion state determined by the combustion state determination section.

Advantageous Effect of the Invention

According to the present invention, since the control value of the input energy is compensated in accordance with the combustion state determined based on the information from the combustion state detector, a target combustion state can be achieved with just enough optimum energy consumption. Hence, it is possible to maintain satisfactory drivability while avoiding misfire without unnecessarily consuming fuel. Further, it is possible to suppress depletion of the plug electrode caused by unnecessary energy input.

Preferably, the input energy control section compensates at least one of a target value of the secondary current and the energy input period in accordance with the operation state of the internal combustion engine in compensating the control value of the input energy. For example, the target value of the secondary current is increased under the condition of high rotation and high load, and the energy input period is increased under the condition of low rotation and low load. In this manner, by changing the control value to be compensated in accordance with the operation condition, it becomes possible to improve the combustion state with less energy.

Further, it is preferable that the input energy control section commands an internal combustion engine control section which controls the operation state of the internal combustion engine to change the air-fuel ratio of an air-fuel mixture to the rich side upon determining that the combustion state detected by the combustion state determination section is such that the target combustion state cannot be achieved by compensating the control value of the input energy. This makes it possible to maintain satisfactory drivability not only by the condition adjustment of the energy input control by the ignition apparatus but also by changing the air-fuel ratio.

Further, it is preferable that the input energy control section outputs a diagnostic signal upon determining that the combustion state detected by the combustion state determination section is such that the target combustion state cannot be achieved by compensating the control value of the input energy or by changing the air-fuel ratio. By quickly notifying a driver of an abnormality of the combustion state, failure handling can be taken early.

BRIEF DESCRIPTION OF DRAWINGS

FIG. 6 is a map showing a relationship between a controlled value to be compensated and an engine rotational speed and an engine load.

DESCRIPTION OF EMBODIMENTS

In the following, an ignition apparatus according to an embodiment of the present invention is explained with reference to drawings.

Embodiment

The ignition apparatus according to an embodiment of the invention is used for an engine system mounted on a vehicle or the like. In the following explanation of the embodiment, "internal combustion" described in the claims is referred to as "engine".

[The Structure of the Engine System]

Figure 1:
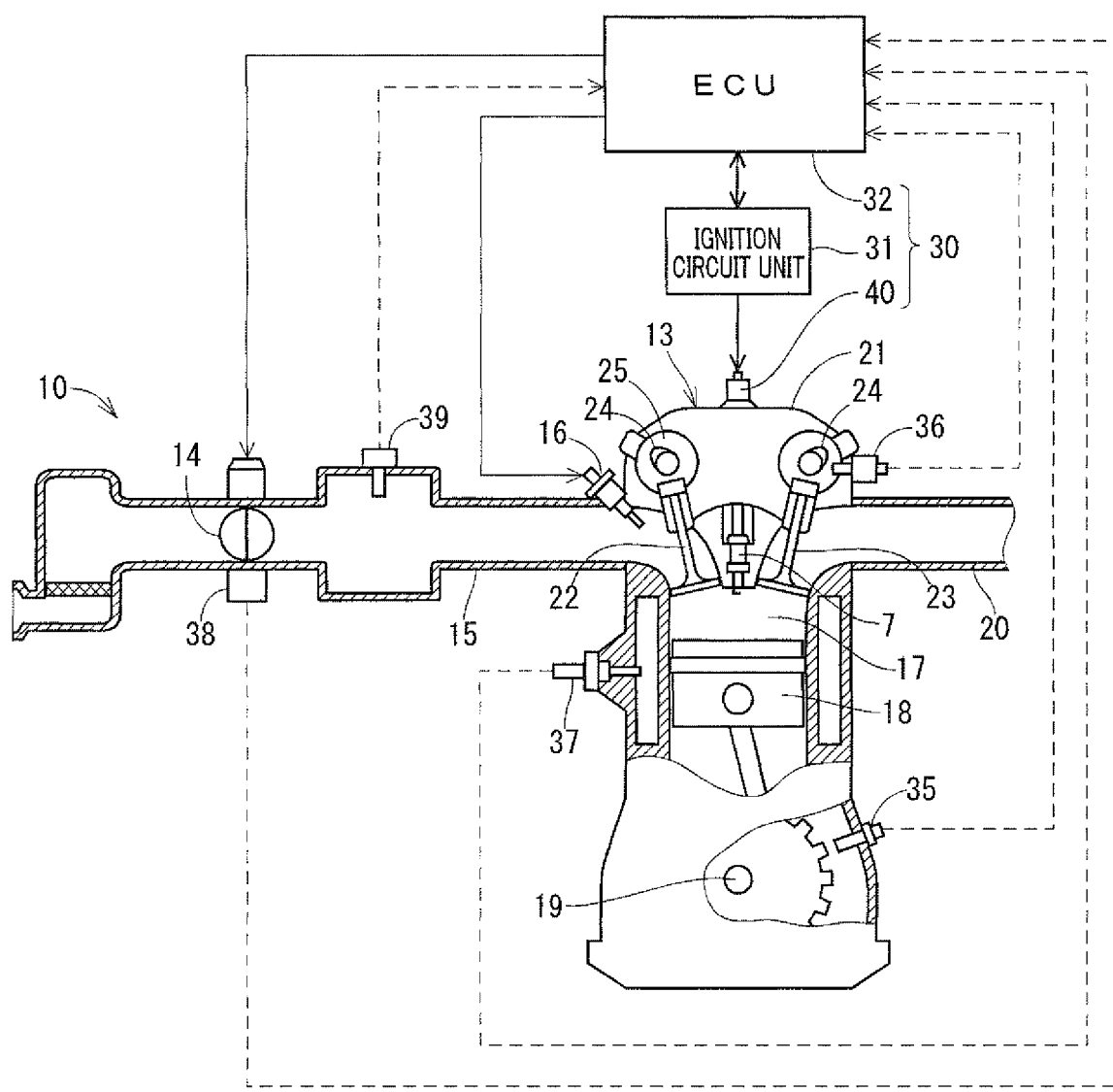
FIG. 1 is a schematic block diagram of an engine system with an ignition apparatus according to an embodiment of the invention.

First, the schematic structure of the engine system is explained with reference to FIG. 1. As shown in FIG. 1, the engine system 10 includes an engine 13 of the spark ignition type. The engine 13 is a multi-cylinder, for example, four-cylinder engine. FIG. 1 shows a cross section of only one cylinder. The structure explained in the following is provided as well in the other cylinders not shown in the drawings. It is assumed that the engine system 10 of FIG. 1 does not include an EGR (Exhaust Gas Recirculation) system. Alternatively, even if an EGR is included, it is omitted from illustration because it is less relevant with the feature of this embodiment. Further, a catalyst provided in an exhaust passage is also omitted from illustration.

The engine 13 causes an air-fuel mixture of air supplied from an intake manifold 15 through a throttle valve 14 and fuel injected from an injector 16 to combust in a combustion chamber 17 so that a piston 18 is reciprocated by an explosive power at the time of the combustion. The reciprocative movement of the piston 18 is outputted after being converted into a rotary movement by a crankshaft 19. The combustion gas is emitted to the atmosphere through an exhaust manifold 20 or the like.

The intake port of a cylinder head 21, which is an entrance of the combustion chamber 17 is provided with an inlet valve 22. The exhaust port of the cylinder head 21, which is an exit of the combustion chamber 17 is provided with an exhaust valve 23. The inlet valve 22 and the exhaust valve 23 are driven to open and close by a valve driving mechanism 24. The valve timing of the inlet valve 22 is adjusted by a variable valve mechanism 25.

Ignition of an air-fuel mixture is performed by causing a discharge to occur between the electrodes of a spark plug 7 by the ignition apparatus 30. The ignition apparatus 30 applies a high voltage from an ignition coil 40 to the spark plug 7 to generate a spark discharge in the combustion chamber 17 by causing an ignition circuit unit 31 to operate based on a command of an electronic control unit 32. The spark plug 7 includes the paired electrodes (see FIG. 2) opposed to each other across a predetermined gap. A discharge is generated when a high voltage sufficient for a dielectric breakdown to occur in the gap is applied between the paired electrodes. In the following explanation, "a high voltage" means a voltage which enables a discharge to occur between the paired electrodes of the spark plug 7.

Figure 2:
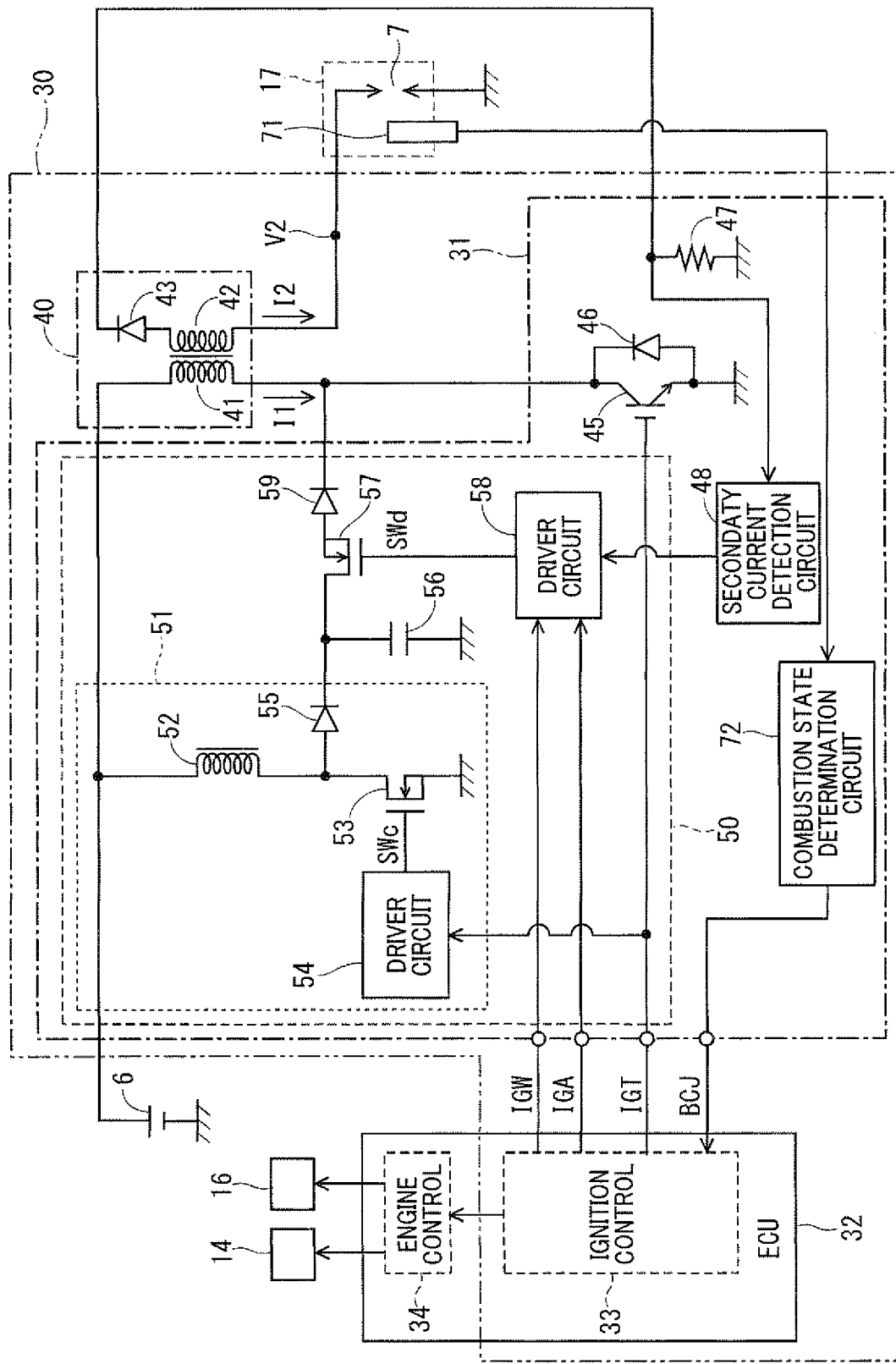
FIG. 2 is a block diagram of the ignition apparatus according to the embodiment of the invention.

The electronic control unit 32, which is comprised of a microcomputer including a CPU, a ROM, a RAM and an I/O port, is indicated by "ECU" in the drawings. As shown in FIG. 2, the electronic control unit 32 is functionally divided into an ignition control part 33 and an engine control part 34 for convenience of explanation. However, this does not mean actual physical division or arrangement. The ignition control part 33 has a function of generating not only input energy but also an ignition signal IGT.

As shown by the broken line arrows, the electronic control unit 32 receives detection signals from various sensors including a crank position sensor 35, a cam position sensor 36, a water temperature sensor 37 a throttle opening degree sensor 38 and an intake air pressure sensor 39. The electronic control unit 32 controls the operation state of the engine 13 by driving the throttle valve 14, the injector 16 and the ignition circuit unit 31 and so on based on the detection signals from these various sensors as shown by the solid line arrows.

[Structure of the Ignition Apparatus]

Next, the structure of the ignition apparatus 30 is explained with reference to FIG. 2. As shown in FIG. 2, the ignition apparatus 30 includes the ignition coil 40, the ignition circuit unit 31 and the ignition control part 33 of the electronic control unit 32.

The ignition coil 40 includes a primary coil 41, a secondary coil 42 and a rectifying element 43 to constitute a known step-up transformer. The primary coil 40 is connected at one end thereof to the positive electrode of a battery 6 as a DC power supply capable of supplying a constant DC voltage, and is grounded at the other end thereof through an ignition switch 45. In the following, the side opposite to the battery 6 of the primary coil 41 is referred to as the "ground side". The secondary coil 42, which is magnetically coupled to the primary coil 41, is grounded at one end thereof through the pair of the electrodes of the spark plug 7, and grounded at the other end thereof through the rectifying element 43 and a secondary current detection resistor 47.

The current flowing through the primary coil 41 is referred to as the primary current I1. The current occurring by intermitting the primary current I1 and flowing through the secondary coil 42 is referred to as the secondary current I2. As shown by the arrows in the drawings, the primary current I1 is positive when it flows in the direction from the primary coil 41 to the ignition switch 45, and the secondary current I2 is positive when it flows in the direction from the secondary coil 42 to the spark plug 7. The voltage on the side of the spark plug 7 of the secondary coil 42 is referred to as the second voltage V2. The rectifying element 43, which is comprised of a diode, rectifies the secondary current I2. The ignition coil 40 causes the secondary coil 42 to generate a high voltage by mutual electromagnetic induction in accordance with change of the current flowing through the primary coil 41, this high voltage being applied to the spark plug 7. In this embodiment, the ignition coil 40 is provided for each spark plug 7.

The ignition circuit unit 31 includes an ignition switch (igniter) 45, an energy input section 50, a secondary current detection resistor 47 and a secondary current detection circuit 48. The ignition circuit unit 31 includes a combustion state determination circuit 72 which is a characteristic component of the present invention.

The ignition switch 45, which is comprised of an IGBT (Insulated Gate Bipolar Transistor), for example, is connected to the ground side of the primary coil 41 of the ignition coil 40 at the collector thereof, grounded at the emitter thereof, and connected to the electronic control unit 32 at the gate thereof. The emitter is connected to the collector through a rectifying element 46. The ignition switch 45 turns on and off in accordance with the ignition signal IGT inputted to the gate. Specifically, the ignition switch 45 turns on at a rise of the ignition signal IGT, and turns off at a fall of the ignition signal IGT. The primary current I1 in the primary coil 41 is intermitted in accordance with the ignition signal IGT by the ignition switch 45.

The energy input section 50 includes a DC-DC converter comprised of an energy accumulation coil 52, a charge switch 53, a charge switch driver circuit 54 and a rectifying switch 55, a capacitor 56, a discharge switch 57, a discharge switch driver circuit 58 and a rectifying element 59. The energy input section 50 continuously inputs energy to the ground side of the primary coil 41.

The DC-DC converter 51 steps up the voltage of the battery 6, and supplies it to the capacitor 56. The energy accumulation coil 52 is connected to the battery 6 at one end thereof and grounded at the other end thereof through the charge switch 53. The charge switch 53, which is comprised of a MOSFET (Metal Oxide Semiconductor Field Effect Transistor), for example, is connected to the energy accumulation coil 52 at the drain thereof, grounded at the source thereof, and connected to the driver circuit 54 at the gate thereof. The driver circuit 54 is capable of turning on and off the discharge switch 53. The rectifying element 55, which is comprised of a diode, prevents a backward current from the capacitor 56 to the energy accumulation coil 52 and the charge switch 53.

When the charge switch 53 is turned on, a current flows to the energy accumulation coil 52 and electrical energy is accumulated. When the charge switch 53 is turned off, the electrical energy accumulated in the energy accumulation coil 52 is discharged to the capacitor 56 while being superimposed to the DC voltage of the battery 6. By the repetition of the on/off operation of the charge switch 53, energy accumulation and energy discharge are repeated in the energy accumulation coil 52 as a result of which the battery voltage is stepped up. The capacitor 56 is connected to the ground side of the energy accumulation coil 52 at one electrode thereof through the rectifying element 55, and grounded at the other electrode thereof. The capacitor 56 accumulates the voltage stepped up by the DC-DC converter 51.

The discharge switch 57, which is comprised of a MOSFET, for example, is connected to the capacitor 56 at the drain thereof, connected to the ground side of the primary coil 41 at the source thereof, and connected to the driver circuit 58 at the gate thereof. The driver circuit 58 is capable of turning on and off the discharge switch 57. The rectifying element 59, which is comprised of a diode, prevents a backward current from the ignition coil 40 to the capacitor 56. Although FIG. 2 shows the structure of only one cylinder, actually, the structure past the discharge switch 57 is provided for each of the cylinders side by side. A current path is branched for each cylinder before the discharge switch 57, so that the energy accumulated in the capacitor 56 is distributed to the respective paths.

The secondary current detection circuit 48 detects the secondary current I2 based on the voltage across the secondary current detection resistor 47 provided in the combustion chamber 17. By a feedback process for causing the secondary current I2 to agree with a target value (referred to as the "target secondary current I2*" hereinafter), the on duty ratio of the discharge switch 57 is determined and commanded to the driver circuit 58.

The combustion state determination circuit 72 determines the combustion state based on a signal received from a combustion state detector 71 provided in the combustion chamber 17, and outputs a combustion state determination signal BCJ to the electronic control unit 32. The specific structure regarding the combustion state determination is described later. The above is the structure of the ignition circuit unit 31.

Next, the ignition control part 33 of the electronic control unit 32 generates the ignition signal IGT and an energy input period signal IGW based on the operation information of the engine 13 acquired from the various sensors including the crank position sensor 35, and outputs them to the ignition circuit unit 31. The ignition signal IGT is inputted to the gate of the ignition switch 45 and the charge switch driver circuit 54. The ignition switch 45 is maintained on during a period while the ignition signal IGT is being inputted. The driver circuit 54 outputs a charge switch signal SWc to the gate of the charge switch 53 to on/off-control the charge switch 53 repeatedly during a period while the ignition signal IGT is being inputted.

The energy input period signal IGW is inputted to the discharge switch driver circuit 58. The driver circuit 58 outputs a discharge switch signal SWd to the gate of the discharge switch 57 to on/off-control the discharge switch 57 repeatedly during a period while the energy input signal IGW is being inputted. A target secondary current signal IGA to indicate the target secondary current I2* is inputted to the driver circuit 58.

[Operation of the Ignition Apparatus]

Next, the operation of the ignition apparatus 30 is explained with reference to the time chart of FIG. 3. The time chart of FIG. 3, in which the horizontal axis is a common time axis, shows changes with time of the ignition signal IGT, the energy input period signal IGW, the capacitor voltage Vdc, the primary current I1, the secondary current I2, the input energy P, the charge switch signal SWc and the discharge switch signal SWd from the top in the vertical axis. Here, the words "capacitor voltage Vdc" means the voltage accumulated in the capacitor 56. The words "input energy P" means energy discharged from the capacitor 56 and supplied to the ignition coil 40 from the side of the low voltage terminal of the primary coil 41, which shows the integrated value from a start of the supply (the initial rise of the discharge switch signal SWd) in one ignition timing.

Figure 3:
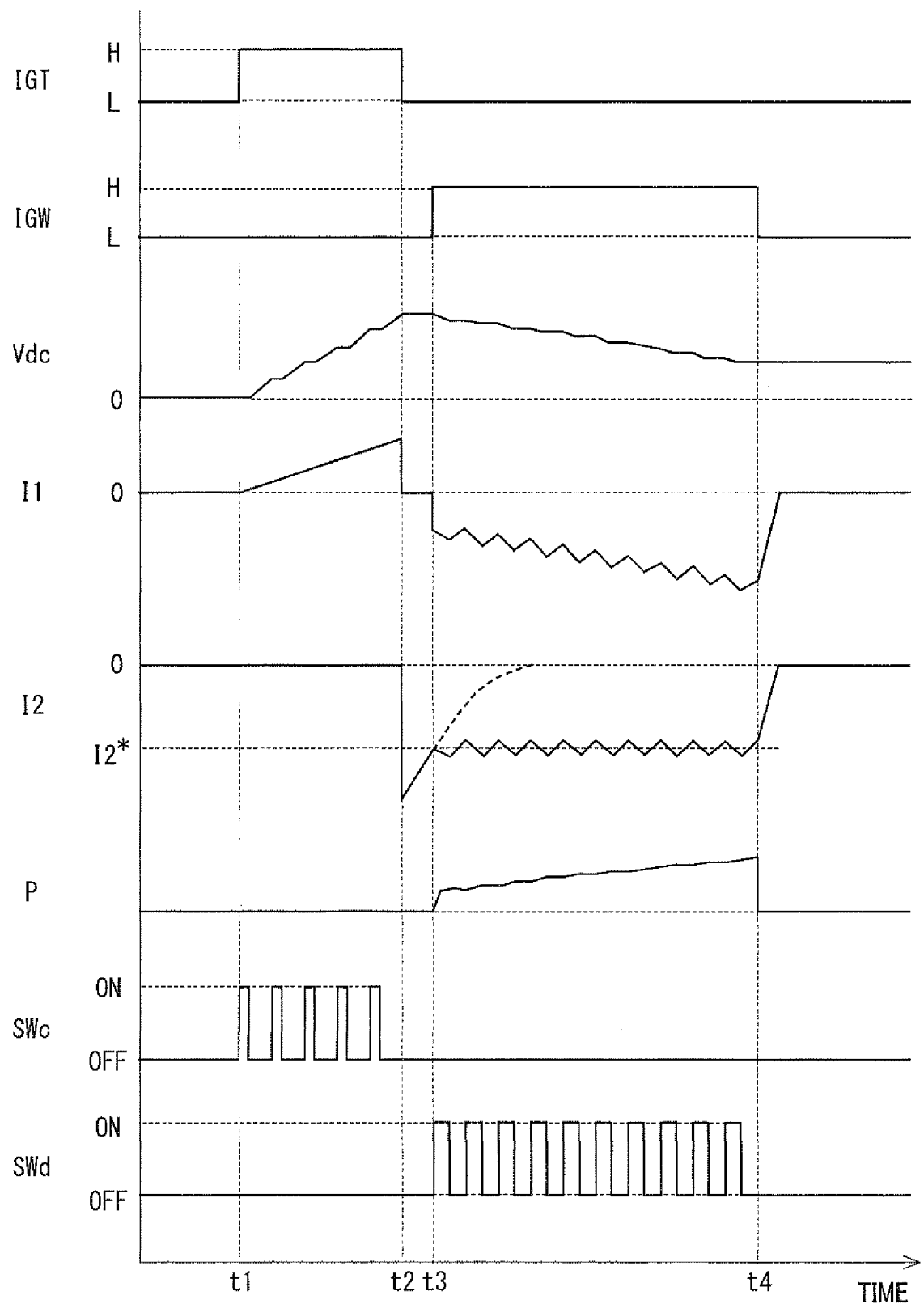
FIG. 3 is a time chart explaining a basic operation of the ignition apparatus of FIG. 2.

In FIG. 3, each of the primary current I1 and the secondary current I2 has a positive value when the current direction is the arrow direction shown in FIG. 2, and has a negative value when it is opposite to the arrow direction. In the following explanation, the word "large" or "small" of a negative current means a magnitude of the absolute value of the current. Accordingly, when a current value deviates from 0 [A} and increases in absolute value, it is expressed that the current increases or rises, and when a current value approaches to 0 [A] and decreases in absolute value, it is expressed that the current decreases or falls.

The control target value of the secondary current I2 for a period from time t3 to t4 while the energy input period signal IGW is being outputted is referred to as the target secondary current I2*. The target secondary current I2* is set to such a current that spark discharging can be maintained satisfactory. In this embodiment, the target value is set to the middle value between a maximum value and a minimum value in waves. However, the target value may be set the maximum value or minimum value in waves in other embodiments.

When the ignition signal IGT rises to the H level (high level) at time t1, the ignition switch 45 is turned on. At this time, since the energy input period signal IGW is at the L level (low level), the discharge switch 57 is off. Accordingly, the primary current I1 in the primary coil 41 starts to flow.

While the ignition signal IGT is at the H level, the discharged switch signal SWc having a rectangular pulse shape is inputted to the gate of the charge switch 53. As a result, the capacitor voltage Vdc increases stepwise during the off period after the charge switch 53 is turned on. In this way, the ignition coil 40 is charged and energy is accumulated in the capacitor 56 by the output of the DC-DC converter during the period from time t1 to time t2 where the ignition signal IGT is at the H level. This energy accumulation is ended before time t2. At this time, the capacitor voltage Vdc, that is, the energy accumulation amount of the capacitor 56 can be controlled by the on duty ratio and the number of times of on and off of the charge switch signal SWc.

Thereafter, when the ignition signal IGT falls to the L level to turn off the ignition switch 45 at time t2, the primary current flowing through the primary coil 41 is interrupted abruptly. As a result, since a high voltage occurs in the secondary coil 42 causing a discharge to occur between the electrodes of the spark plug 7, the secondary current (discharge current) flows. In a case where energy input is not performed after a spark discharge is generated at time t2, the secondary current I2 approaches to 0 [A] with time as shown by the broken line, and when it attenuates to such an extent that discharging cannot be maintained, the discharging is ended. Such an ignition system is called a normal ignition system.

On the other hand, in this embodiment, the energy input period signal IGW is caused to rise to the H level at time t3 immediately after time t2 to turn on the discharge switch 57 with the charge switch 53 being off. Accordingly, the accumulated energy of the capacitor 56 is discharged and inputted to the ground side of the primary coil 41. As a result, the primary current I1 due to the input energy P flows during a spark discharge. The input energy P increases with the increase of the capacitor voltage Vdc accumulated until time t2.

At this time, in the secondary coil 42, the secondary current I2 flowing from time t3 to time t4 is superimposed on a current of the same polarity due to conduction of the primary current I1 caused by the input energy P. This superimposition of the primary current I1 is done each time the discharge switch 57 is turned on during a period from time t3 to time t4. That is, each time the discharge switch signal SWd is turned on, the primary current I1 is added in succession by the accumulated energy of the capacitor 56, and the secondary current I2 is aggregated in succession accordingly. When the secondary current I2 reaches a predetermined value, the discharge switch 57 is turned off to stop the superimposition of the primary current I1. When the secondary current I2 falls below a predetermined threshold, the discharge switch 57 is turned on again. In this way, the secondary current I2 is maintained at the target secondary current I2*. When the energy input period signal IGW has fallen to the L level at time t4, the on-off operation of the discharge signal SWd is stopped, as a result of which both the primary current I1 and the secondary current I2 become zero.

The control method in which energy is inputted into the ignition coil 40 from the ground side of the primary coil 41 after a spark discharge at time t2 has been developed by the present applicant. In the following, the words "energy input control" means this control method. On the other hand, a method in which energy is inputted into the ignition coil 40 from the side of the battery 6 of the primary coil 41 or from the side opposite to the spark plug 7 of the secondary coil 42 such as the well-known multi discharge method is referred to as the "conventional energy input control". According to the energy input control developed by the present applicant, it is possible to efficiently input a minimum amount of energy and maintain an ignitable state for a certain period by inputting the energy from the low voltage side compared to the conventional multi discharge control and the like.

Incidentally, it may occur that a combustion state changes due to a change of a driving state or environmental condition such as temperature while driving in a lean-combustion state in a high speed and high load state. If the condition of the energy input control is always uniform regardless of such a change of the combustion state, there is a concern that the drivability is lowered due to misfire or the like when the combustion state worsens. On the other hand, there is a possibility that fuel consumption can be further reduced to further improve fuel efficiency when the combustion state is particularly satisfactory.

Therefore, in the ignition apparatus 30 of this embodiment, the combustion state detector 71 detects information reflecting the combustion state, and the combustion state determination circuit 72 determines the combustion state based on this information. It is characterized that the control value of energy input by the energy input section 50, that is, the condition of the energy input control is appropriately compensated in accordance with the detected combustion state. In principle, the control value updated by the compensation is reflected from the next combustion cycle after the determination is made. If it is difficult to achieve a target combustion state even when the condition of the energy input control is compensated, a signal is outputted to the actuator of the throttle valve 14 and the injector 16 from the engine control part 34 of the electronic control unit 32 so that an air intake amount and a fuel injection amount are controlled so as to enrich the air-fuel ratio. Further, if the combustion state is not improved even when the air-fuel ratio has been changed, a diagnostic signal is outputted.

The combustion state can be detected by the following methods of:
(a) detecting variation of the combustion pressure;
(b) detecting rotational variation of the crankshaft;
(c) detecting an ion current; and
(d) detecting variation of the air-fuel ratio.
(e) In the energy input control of this embodiment, the secondary voltage V2, the secondary current I2 and a feedback amount of the secondary current I2 are detected. When the secondary voltage V2 is high, it means that the in-cylinder pressure of the combustion chamber 17 is high, and a spark is prolonged. When the secondary current I2 is low and the feedback amount is large, it means that the flow velocity is high. Accordingly, when the secondary voltage V2 is high and the feedback amount of the secondary current I2 is large, it can be determined that the combustion is normal. On the other hand, when the secondary voltage V2 is low and the feedback amount is null, it can be determined that the combustion is insufficient.

Figure 4:
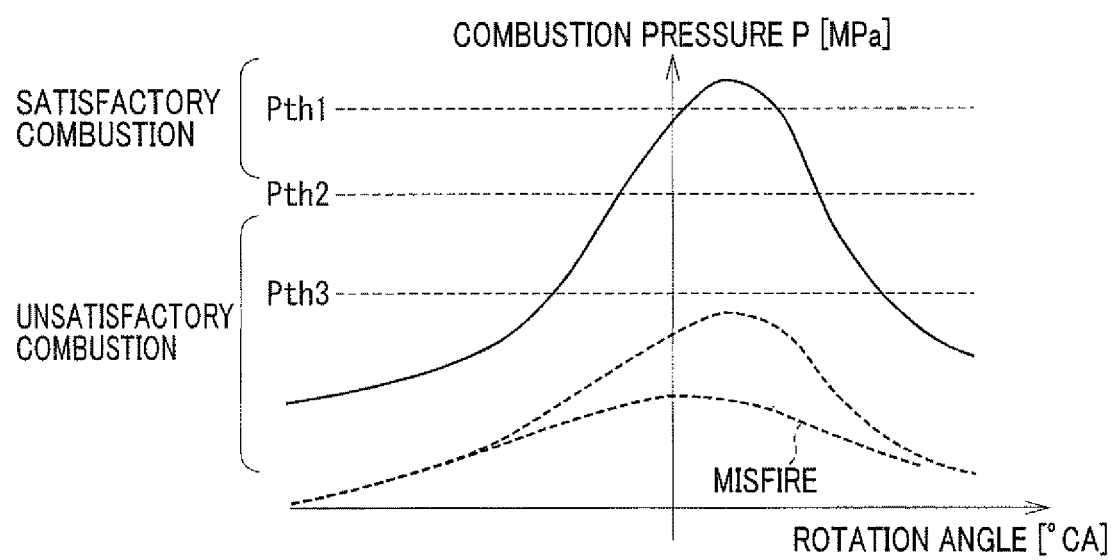
FIG. 4 is a waveform diagram of a combustion pressure as a combustion state.

Next, the method which the combustion state determination circuit 72 performs to determine the combustion state based on the combustion pressure P detected by the combustion state detector 71 provided in the combustion chamber 17 is explained in detail with reference to FIG. 4. As shown in FIG. 4, a plurality of thresholds, for example, a first threshold Pth1, a second threshold Pth2 and a third threshold Pth1, are set for the combustion pressure. The first threshold Pth1 is a threshold to determine that there is a sign of combustion worsening when the combustion pressure P is lower than it. The second threshold Pth2 is a threshold to determine that it is necessary to compensate the energy input control condition when the combustion pressure P is lower than it. The third threshold Pth3 is a threshold to determine that it is necessary to enrich the air-fuel ratio when the combustion pressure P is lower than it. Further, when the combustion pressure P is lower than the third threshold Pth3, it is determined that misfire is occurring.

Figure 5A:
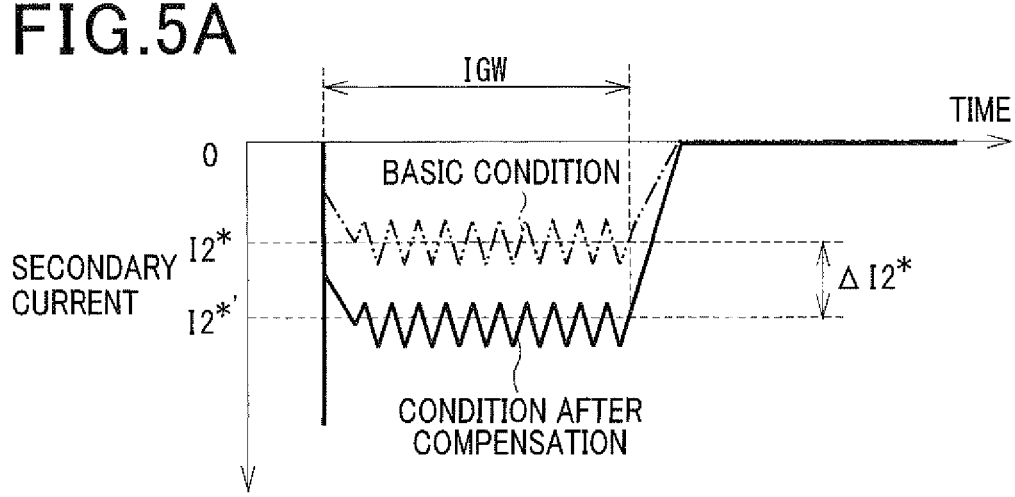
FIG. 5A is a time chart when a target secondary current is compensated in the ignition apparatus of FIG. 2.
Figure 5B:
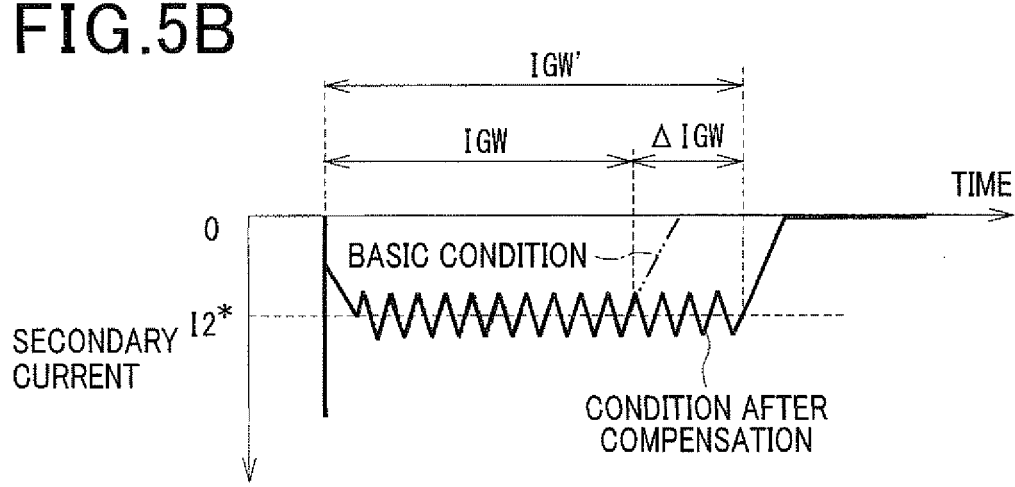
FIG. 5B is a time chart when an energy input period is compensated in the ignition apparatus of FIG. 2.
Figure 5C:
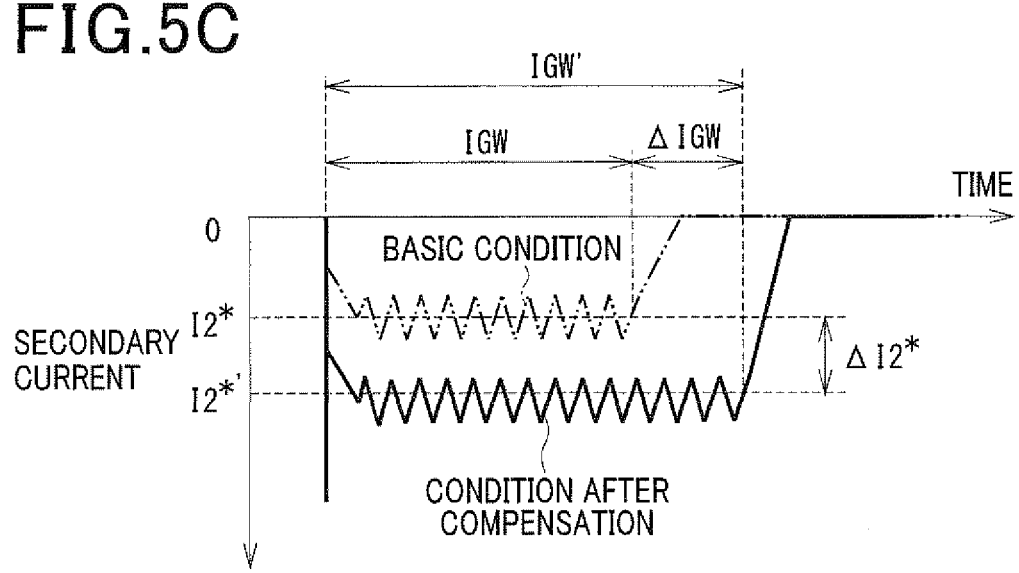
FIG. 5C is a time chart when the target secondary current and the energy input period are compensated in the ignition apparatus of FIG. 2.

The compensation of the control value of the input energy is explained with reference to FIGS. 5 and 6. In FIG. 5, the symbol "IGW" means not an energy input period "signal" but an energy input "period". In FIGS. 5A, 5B and 5C, a transition of the secondary current under a basic condition is shown by a two-point chain line. In the method shown in FIG. 5A, the energy input period IGW is not changed, but the target secondary current is increased from the basic value I2* by an compensation amount of ΔI2* to have an updated value I2*' with respect to the basic condition. In the method shown in FIG. 5B, the target secondary current I2* is not changed, but the energy input period is increased from the basic value IGW by a compensation value ΔIGW to have an updated value of IGW'. In the method shown in FIG. 5C, the target secondary current is increased from the basic value I2* by the compensation value ΔI2* to have the updated value I2*', and the energy input period is increased from the basic value IGW by the compensation amount to have the updated value IGW'.

It is determined in accordance with the operating condition of the engine 13 which if either of the target secondary current I2* and the energy input period IGW should be compensated or whether both of them should be compensated. The engine speed-load (torque) characteristic shown in FIG. 6 exhibits a mountain-shape characteristic curve in which the full load rises with the increase of the rotational speed in a low speed range, maintains roughly constant in a middle range, and falls with the increase of the rotational speed in a high speed range.

In a case where importance is placed on improvement of the combustion state when it worsens in a lean combustion area Lb, it is preferable to intensify discharging by increasing the target secondary current I2* for a "high speed and high load condition" corresponding to the upper right part of the drawing. On the other hand, for a "low speed and low load condition" corresponding to the lower left part of the drawing, it is preferable to increase ignition chances by increasing the energy input period IGW. This makes it possible to improve combustion efficiently with less energy.

Both the target secondary current I2* and the energy input period IGW may be compensated by multiplying each of them by a weighting coefficient in accordance with the driving condition. For example, when standard compensation values for the target secondary current I2* and the energy input period IGW are ΔI2* and ΔIGW, respectively, it is possible to compensate as follows depending on the driving condition.

For the case of high speed and high load . . . 0.8×ΔI2*, 0.2×ΔIGW

For the case of low speed and low load . . . 0.2×ΔI2*, 0.8×ΔIGW

Figure 7:
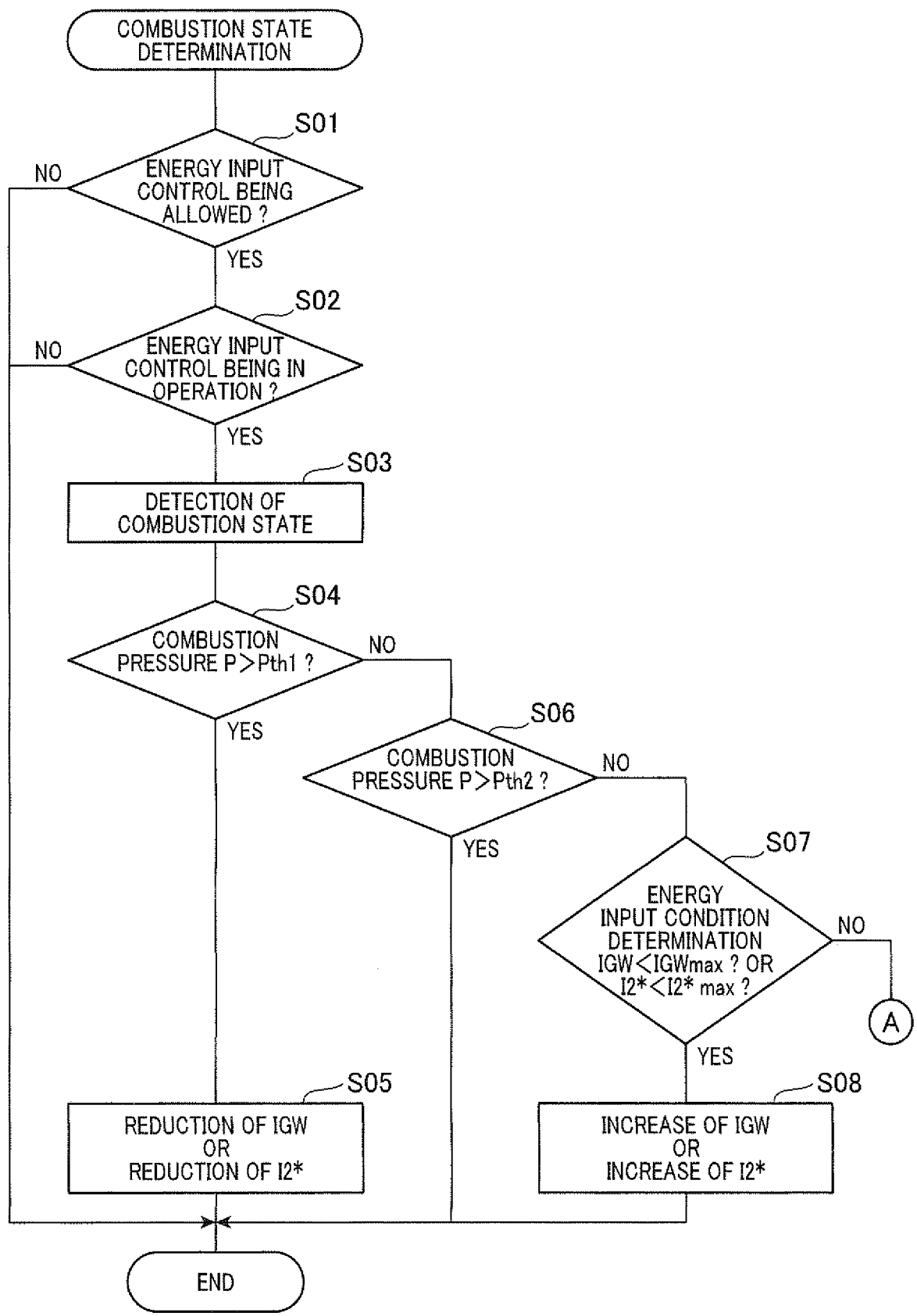
FIG. 7 is a flowchart (1) of a combustion state determination process by the ignition apparatus of FIG. 2.
Figure 8:
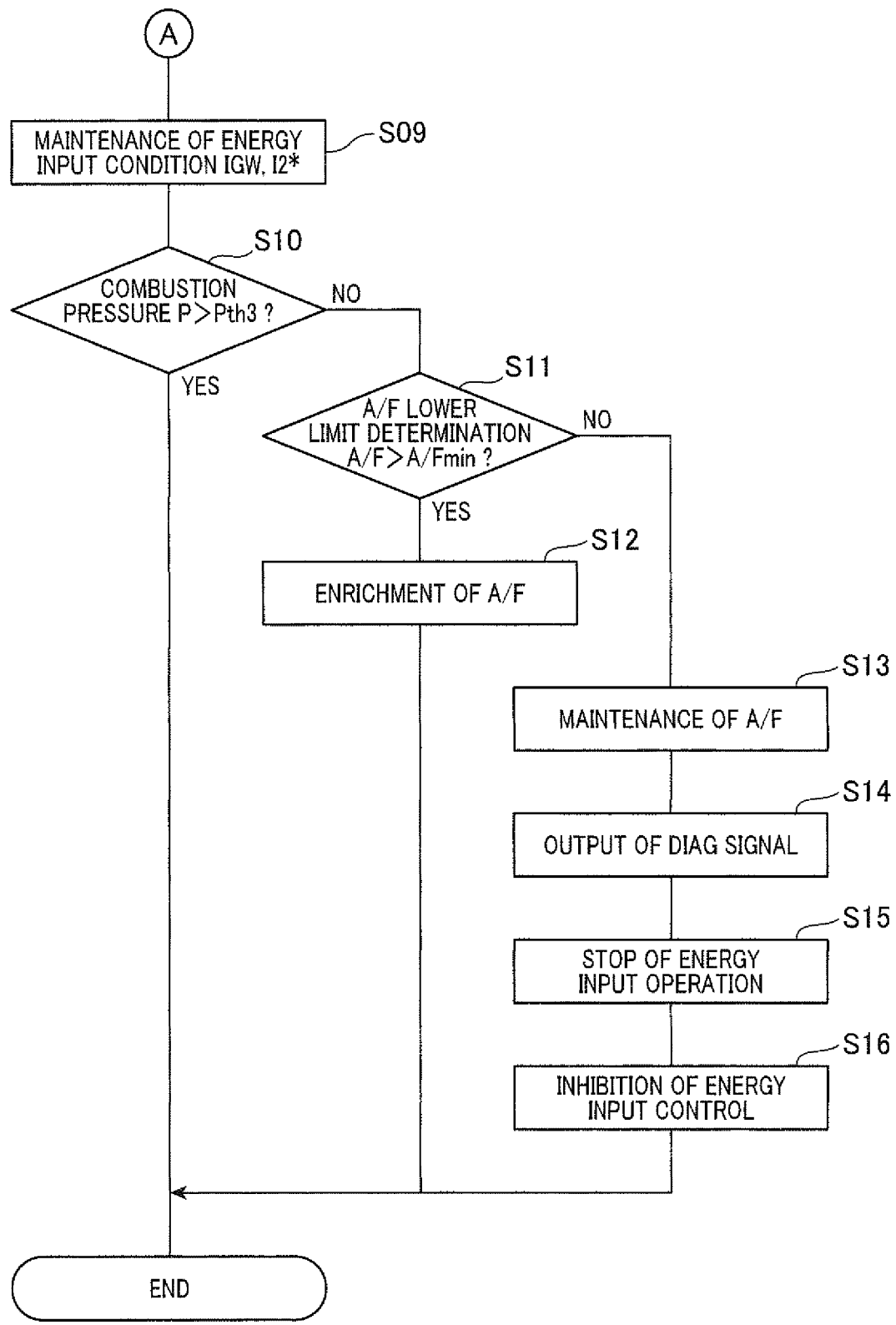
FIG. 8 is a flowchart (2) of a combustion state determination process by the ignition apparatus of FIG. 2.

Next, the combustion state determination process in this embodiment is explained with reference to the flowcharts of FIG. 7 and FIG. 8. The series of the process shown in FIG. 7 and FIG. 8 are performed for each predetermined number of combustion cycles of the engine 13, for example. In principle, this process is performed for each cylinder. However, to simply the structure, two or more of the cylinders may be controlled as a group. Also, a learning control may be reflected. In the following explanation of the flowcharts, the sign "S" means a step.

In the combustion state determination process, it is determined whether or not the energy input control is being allowed (S01), and whether or not the energy input is in operation (S02). If any one of them is NO, the process is terminated. If the energy input control is being allowed (S01: YES) and the energy input is in operation (S02: YES), the combustion state is detected in S03.

The combustion state determination circuit 72 of this embodiment determines the combustion state of the engine 13 by comparing an average combustion pressure P of a predetermined number of cycles in the combustion chamber 17 with the thresholds Pth. As shown in FIG. 4, the first threshold Pth1, the second threshold Pth2 and the third threshold Pth3 are set in a relationship of Pth1>Pth2>Pth3. In the following steps, the higher threshold Pth is compared earlier with the combustion pressure P. The average combustion pressure P of a predetermined number of cycles is an average value in the 10 most recent cycles before the latest ignition, for example.

If the combustion pressure P is higher than the first threshold Pth1 (S04: YES), the energy input period IGW is shortened or the target secondary current I2* is reduced in S05 assuming that the combustion state is sufficiently satisfactory and there is a margin in the present energy input condition, and then the process is terminated. If the combustion pressure P is lower than the first threshold Pth1 and higher or equal to the second threshold Pth2 (S04: NO, S06: YES), the process is terminated directly assuming that the combustion state is satisfactory, and the present energy input condition is appropriate.

If the combustion pressure P is lower than the second threshold Pth2 (S06: NO), it is determined that the present combustion state is not satisfactory. In subsequent S07, it is determined whether or not there is room for compensating the present energy input condition to improve the combustion state, specifically, whether or not the present combustion state is such that the energy input period IGW is smaller than a maximum value IGWmax or the target secondary current I2* is smaller than a maximum value I2*max.

If it is YES in S07, the energy input period IGW or the target secondary current I2* is increased in S08, and then the process is terminated. If it is NO in S07, the energy input period IGW and the target secondary current I2* are maintained in S09. If the combustion pressure P is higher than the third threshold Pth3 (S10: YES), the process is terminated directly assuming that although the combustion state is not satisfactory, it is not necessary to change the air-fuel ratio. The above updated value of the energy input period IGW or the target secondary current I2* is applied from the next cycle after the determination process is performed in principle.

If the combustion pressure P is lower than the third threshold Pth3 (S10: NO), it is determined in S11 whether or not the air-fuel ratio (indicated as "A/F" in the drawing) can be enriched. If the present air-fuel ratio is larger than a lower limit (A/Fmin) to enrich (S11: YES), the air-fuel ratio is enriched in S12 by the engine control part 34 of the electronic control unit 32, and then the process is terminated.

On the other hand, if the present air-fuel ratio is smaller than or equal to the lower limit (A/Fmin) to enrich (S11: NO), it is determined that it is not possible to improve the combustion state by changing the air-fuel ratio. Subsequently, the present air-fuel ratio is maintained (S13), and a diagnostic signal showing that the combustion state is abnormal is outputted (S14). Specifically, by informing the driver of the abnormality by a warning lamp or the like, failure handling can be taken early. Further, the electronic control unit 32 stops the energy input operation (S15), and prohibits the energy input control (S16). Then, the process is terminated.

Advantageous Effects (1) The ignition apparatus 30 of this embodiment includes the combustion state determination circuit 72 for determining the combustion state based on the information detected by the combustion state detector 71, and the ignition control part 33 of the electronic control unit 32 compensates the control value of the input energy in accordance with the combustion state detected by the combustion state determination circuit 72. This makes it possible to achieve a target combustion state with just enough consumption energy. Accordingly, it is possible to maintain satisfactory drivability while preventing misfire without consuming fuel unnecessarily. In addition, it is possible to suppress wear of the plug electrodes caused by unnecessary energy input.

(2) The ignition control part 33 commands the engine control part 34 to change the air-fuel ratio to the rich side upon detecting that the combustion state detected by the combustion state determination circuit 72 is such that a target combustion state cannot be achieved by compensating the control value of the input energy. The engine control part 34 changes the air-fuel ratio to the rich side by controlling the opening degree of the throttle valve 14 or a fuel injection amount of the injector 16. This makes it possible to maintain the satisfactory drivability by changing the air-fuel ratio without being limited to adjusting the condition of the energy input control by the ignition apparatus 30.

(3) The ignition control part 33 outputs a diagnostic signal upon detecting that the combustion state detected by the combustion state determination circuit 72 is such that a target combustion state cannot be achieved by compensating the control value of the input energy or by changing the air-fuel ratio. By informing a driver of the combustion state being abnormal using the diagnostic signal, early handling of malfunction, for example, visiting an automobile dealer, can be taken.

(4) The ignition apparatus 30 of this embodiment employs, as a method of energy input control, the method in which the energy stepped up by the DC-DC converter 51 and accumulated in the capacitor 56 is inputted from the ground side of the primary coil 41. This makes it possible to hold an ignitable state over a certain period while efficiently inputting a minimum amount of energy by inputting energy from the low voltage side, compared to the multi discharge energy input method or the like. Since the secondary current I2 always has a negative value and has no zero-crossing during the energy input period IGW unlike other methods using an AC current, it is possible to prevent occurrence of a blowout.

(5) Since the ignition apparatus 30 of this embodiment includes the secondary current detection resistor 47 and the secondary current detection circuit 48 to feedback-control the secondary current I2, it is possible to make the actual value of the secondary current I2 equal to the target secondary current I2* at a high degree of accuracy compared to feed-forward control.

Other Embodiments (a) In the above embodiment, the control condition in the method in which energy is inputted from the ground side of the primary coil, which has been developed by the present applicant, is compensated in accordance with the combustion state. The present invention can be used for other energy input control methods which enable variably controlling a secondary current or an energy input period, such as the conventional multi discharge method or the DCO method disclosed in Japanese Patent Application Laid-open No. 2012-167665, to compensate ignition energy by compensating the control value of input energy, the number of times of ignition, or coil power supply in accordance with the combustion state.

The energy input control by the ignition apparatus 30 of the structure of FIG. 2 does not necessarily have to be limited to the method in which the charge switch signal SWc is turned on and off while the ignition signal IGT is at the H level to accumulate the capacitor voltage Vdc, and thereafter, energy is inputted to the ground side of the primary coil 41 as shown in FIG. 3. For example, it is possible that the charge switch signal SWc and the discharge switch signal SWd are turned on and off alternately, and the energy accumulated in the energy accumulation coil 52 when the charge switch signal SWc is on is inputted to the ground side of the primary coil 41 every time. In this case, the capacitor 56 may not be included.

(b) The control of the secondary current I2 is not limited to the form in which the secondary current detection resistor 47 and the secondary current detection circuit 48 are provided, and the secondary current I2 is feedback-controlled. For example, it is possible that secondary current detection resistor 47 and the secondary current detection circuit 48 are not provided, and the secondary current I2 is feedforward-controlled.

(c) The ignition circuit unit 31 may be housed in a housing that houses the electronic control unit 32, or housed in a housing that houses the ignition coil 40. The ignition switch 45 and the energy input section 50 may be housed in individual housings. For example, it is possible that ignition switch 45 is housed in a housing that houses the ignition coil 40, and the energy input section 50 is housed in a housing that houses the electronic control unit 32.

(d) The ignition switch is not limited to be an IGBT. It may be comprised of a switching element having a relatively high voltage withstand capability other than an IGBT. The charge switch and the discharge switch are not limited to a MOSFET. They may be comprised of a switching element other than a MOSFET.

(e) The DC power supply is not limited to a battery. For example, it may be comprised of a stabilized DC power supply in which an AC voltage is stabilized by a switching regulator.

(f) In the above embodiment, the energy input section 50 steps up the voltage of the battery 6 by the DC-DC converter 51. When the ignition apparatus is mounted on a hybrid vehicle or an electric vehicle, the output voltage of a main machine battery as it is or after being stepped down may be used as the input energy.

(g) The electronic control unit 32 may be formed as one unit including the functional parts of the ignition control part 33 and the engine control part 34, or separate units which communicate with each other through signal lines or the like. The present invention is not limited to the above described embodiment, and can be practiced in various forms without departing from the spirit of the invention.

EXPLANATION OF REFERENCE SIGNS

13 . . . internal combustion engine, 17 . . . combustion chamber
30 . . . ignition apparatus
33 . . . ignition control part
34 . . . engine control part
40 . . . ignition coil
41 . . . primary coil, 42 . . . secondary coil
45 . . . ignition switch
50 . . . energy input section
6 . . . battery (DC power supply)
7 . . . spark plug
71 . . . combustion state detector
72 . . . combustion state determination circuit (combustion state determination section)

The invention claimed is:

1. An ignition apparatus for controlling operation of a spark plug for igniting an air-fuel mixture in a combustion chamber of an internal combustion engine, comprising:
an ignition coil including a primary coil through which a primary current supplied from a DC power supply flows, and a secondary coil which is connected to an electrode of the spark plug and in which a secondary voltage occurs due to conduction and interruption of the primary current causing a secondary current to flow therethrough;
an ignition switch which is connected to a ground side opposite to the DC power supply of the primary coil and intermits the primary current in accordance with an ignition signal;
an energy input section configured to input energy to the primary coil of the ignition coil with a same polarity as the secondary current in a predetermined energy input period after the primary current is interrupted by the ignition switch and a discharge of the spark plug is generated by the secondary voltage due to the interruption;
an input energy control section configured to control the input energy; and
a combustion state determination section configured to acquire information from a combustion state detector for detecting a combustion state in the combustion chamber, and determines the combustion state based on the information, wherein:
the input energy control section is further configured to compensate a control value of the input energy in accordance with the determined combustion state;
the energy input section is further configured to input the energy to the primary coil of the ignition coil with the same polarity as the secondary current flowed by the discharge of the spark plug, and the secondary voltage is generated due to the primary current being interrupted by the ignition switch being turned off after the primary current starts to flow due to the ignition switch being turned on;
the energy input section includes a rectifying element configured to being connected to the ground side of the primary coil, interrupt a current which flows in the direction to a ground, and flow a current to the ground side of the primary coil from the ground; and
the rectifying element is configured to flow a current to the ground side of the primary coil from the ground even if the primary current is interrupted by the ignition switch being turned off.

2. The ignition apparatus according to claim 1, wherein the energy input section is further configured to input energy to the ignition coil from the ground side of the primary coil.

3. The ignition apparatus according to claim 1, wherein the input energy control section is further configured to compensate at least one of a target value of the secondary current and the energy input period in accordance with an operation state of the internal combustion engine in compensating the control value of the input energy.

4. The ignition apparatus according to claim 1, wherein the ignition control section is further configured to command an engine control part for controlling an operation state of the internal combustion engine to change an air-fuel ratio to a rich side upon detecting that the detected combustion state is such that a target combustion state cannot be achieved by compensating the control value of the input energy.

5. The ignition apparatus according to claim 4, wherein the input energy control section is further configured to output a diagnostic signal upon detecting that the detected combustion state is such that the target combustion state cannot be achieved by compensating the control value of the input energy or by changing the air-fuel ratio.

6. The ignition apparatus according to claim 1, wherein the combustion state determination section is further configured to include a plurality of thresholds for the combustion state.

7. The ignition apparatus according to claim 1, wherein the combustion state determination section is further configured to determine the combustion state based on a combustion pressure in the combustion chamber.

8. An ignition apparatus for controlling operation of a spark plug for igniting an air-fuel mixture in a combustion chamber of an internal combustion engine, comprising:
an ignition coil including a primary coil through which a primary current supplied from a DC power supply flows, and a secondary coil which is connected to an electrode of the spark plug and in which a secondary voltage occurs due to conduction and interruption of the primary current causing a secondary current to flow therethrough;
an ignition switch which is connected to a ground side opposite to the DC power supply of the primary coil and intermits the primary current in accordance with an ignition signal;
an energy input section configured to input energy to the primary coil of the ignition coil with a same polarity as the secondary current in a predetermined energy input period after the primary current is interrupted by the ignition switch and a discharge of the spark plug is generated by the secondary voltage due to the interruption;

an input energy control section configured to control the input energy; and a combustion state determination section configured to acquire information from a combustion state detector for detecting a combustion state in the combustion chamber, and determines the combustion state based on the information, wherein:

the input energy control section is further configured to compensate a control value of the input energy in accordance with the determined combustion state;

the energy input section is further configured to input the energy to the primary coil of the ignition coil with the same polarity as the secondary current flowed by the discharge of the spark plug, and the secondary voltage is generated due to the primary current being interrupted by the ignition switch being turned off after the primary current starts to flow due to the ignition switch being turned on;

the energy input section includes a capacitor, a switch and a rectifying element; and the capacitor, the switch and the rectifying element form a structure that is configured to input energy with the same polarity as the secondary current to the ignition coil from the ground side of the primary coil.

* * * * *